Feb. 5, 1952

A. E. STOCKER 2,584,510

BRAKE WEAR TAKE-UP

Filed Jan. 2, 1948

INVENTOR
ALFRED E. STOCKER
BY
Mellin and Hanscom
HIS ATTORNEYS

Feb. 5, 1952 A. E. STOCKER 2,584,510
BRAKE WEAR TAKE-UP
Filed Jan. 2, 1948 2 SHEETS—SHEET 2
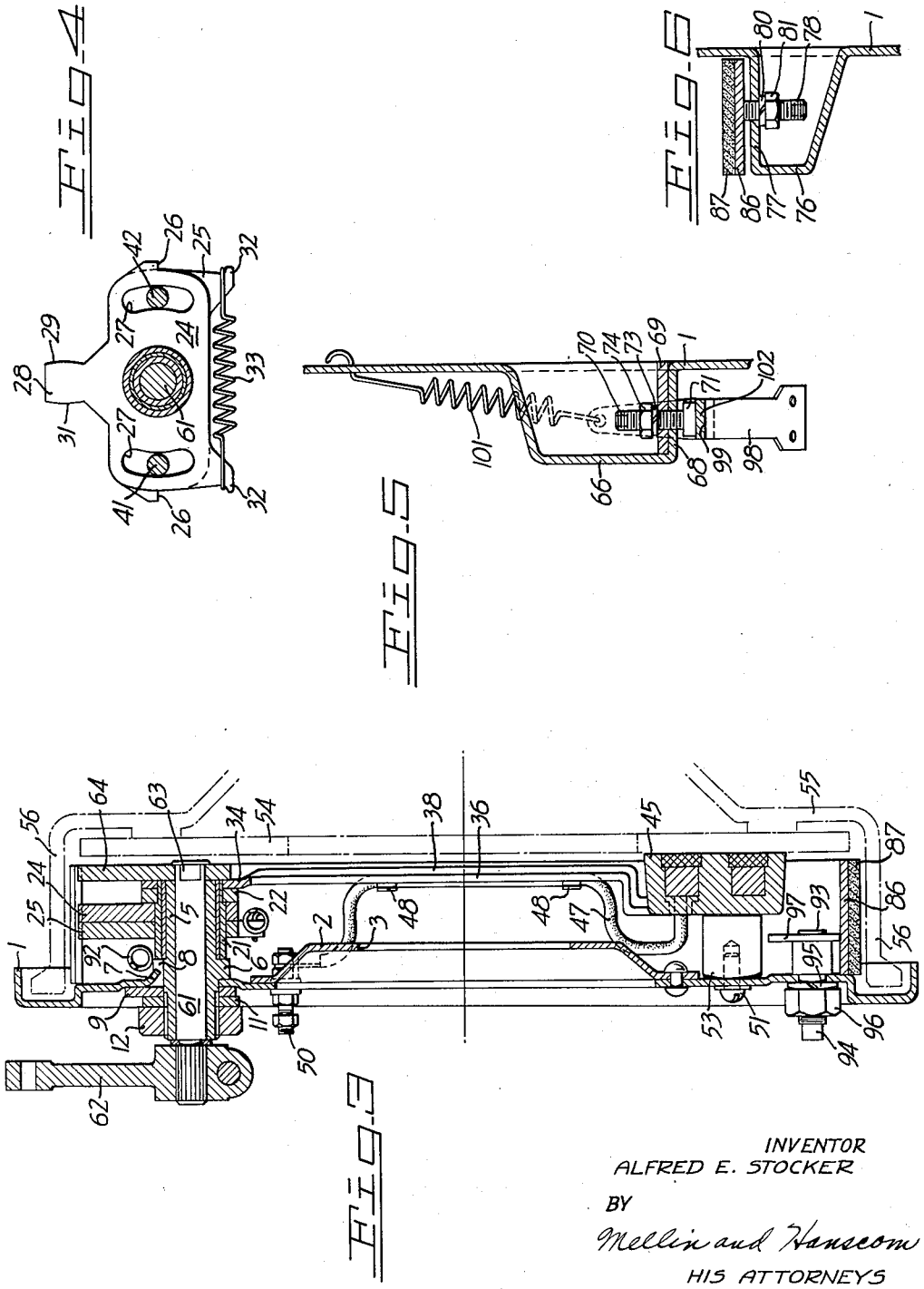
INVENTOR
ALFRED E. STOCKER
BY
Mellin and Hanscom
HIS ATTORNEYS Patented Feb. 5, 1952

2,584,510

UNITED STATES PATENT OFFICE 2,584,510

BRAKE WEAR TAKE-UP

Alfred E. Stocker, Mercer Island, Wash., assignor to Anchor Brake Corporation, Oakland, Calif., a corporation of California Application January 2, 1948, Serial No. 190

2 Claims. (Cl. 188—79.5)

This invention relates to a servo electric brake, and in general has for its object the provision of a brake of this type, wherein only a portion of its continuous brake band is brought into play during a braking operation; wherein the brake band spreading mechanism can be readily adjusted to compensate for wear or for any other reason, and wherein its parts are interchangeable and can therefore be used for right or left hand brakes.

More specifically, this invention relates to and has for its object the provision of a magnetically operated servo brake wherein: a brake band is spread into engagement with its associated brake drum by a cam member carried on one end of a lever, the lever being pivoted intermediate its ends to a fixed plate and being provided at its opposite end with an electromagnet; wherein said electromagnet is arranged when energized, to be drawn into frictional engagement with an armature disc carried by said brake drum; wherein said electromagnet is normally biased to its inoperative position by a supplemental permanent magnet carried by the back plate of the brake; and wherein said back plate is provided with pressed pockets, the walls of which serve to support means for externally adjusting the position of the brake band relative to the brake drum.

The invention possesses other advantageous features, some of which with the foregoing will be set forth at length in the following description where those forms of the invention which have been selected for illustration in the drawings accompanying and forming a part of the present specification are outlined in full. In said drawings, two forms of the invention are shown, but it is to be understood that it is not limited to such forms, since the invention, as set forth in the claims, may be embodied in a plurality of forms.

Referring to the drawings:

Fig. 3 is a vertical mid-section taken on the line 3—3 of Fig. 1.

Fig. 4 is a section taken on the line 4—4 of Fig. 2.

Fig. 5 is a vertical section taken on the section line 5—5 of Fig. 1.

Fig. 6 is a fragmentary section taken on the section line 6—6 of Fig. 1.

In general, the brake illustrated in these figures includes a back plate arranged for mounting on the axle housing of a vehicle and through which an axle of the vehicle passes. Journaled on the upper end of the back plate along the vertical diameter thereof is a fulcrum pin, and journaled on this pin is a downwardly extending yoke lever or wishbone. Mounted on the lower ends of the wishbone for transverse sliding movement therein is an electromagnet arranged when energized to engage an armature disc fastened to the adjacent brake drum for rotation therewith. Expandibly mounted on the back plate is a circular brake band, split at its upper diameter for the reception of an adjustable two-part actuating lever formed as an upwardly extending and integral part of the wishbone. Also journaled on the fulcrum pin is a shaft to which is fixed a brake band expanding cam arranged to be operated as a hand brake independently of the operation of the electromagnet. Fixed to the inside of the brake band on either side of its vertical diameter and at about 30° below its horizontal center line are a pair of stops, each arranged to be engaged by a complementary and adjustable stop carried by the walls of a pocket pressed in the back plate. Also extending through these walls are brake band adjusting screws.

Normally, the brake band is held in its inoperative and retracted position by a set of symmetrically arranged springs. However, when the electromagnet is energized it contacts the rotary armature ring and tends to follow it, thereby causing the actuating lever to swing to one side, which in turn expands the brake band. If the actuating lever swings to the right (clockwise as viewed in Fig. 1) the complementary stops on the left side of the brake engage each other, thereby limiting the area of contact between the band and the drum to 240°. To prevent the electromagnet from contacting the armature plate during non-braking periods and any consequent rattling thereof, I have provided the back plate with a pair of small permanent magnets serving to hold the electromagnet positively spaced from the armature plate during non-braking periods.

To enable the brake to be used as an emergency or hand brake, a lever is keyed to the fulcrum pin and the free end of the lever is connected by a rod or cable to a conveniently located hand lever.

Referring now particularly to the drawings, the brake illustrated therein comprises an apertured back plate 1, stiffened by an inwardly dished stiffening member 2. The stiffening member 2 is provided with a central opening 3 for the reception of a wheel axle and with bolt holes 4 for fastening the back plate to the stationary axle housing of a vehicle.

Figure 2:
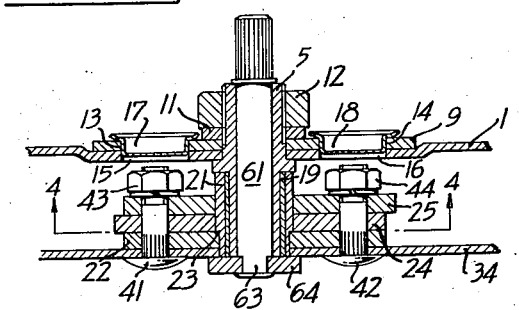
Fig. 2 is a fragmentary horizontal section taken on the section line 2—2 of Fig. 1.

Mounted on the back plate 1, adjacent the upper end of its vertical diameter is a hollow cam shaft stud 5 provided intermediate its ends with a flange 6 in engagement with inner face of the back plate. Pressed inwardly from the back plate 1 is a finger 7, keyed in a slot 8 formed in the flange 6. Seated against the outer face of the back plate 1 over the protruding end of cam shaft stud 5 is a generally rectangular reinforcing plate 9. Threaded on the end of the stud 5 against a lock washer 11 is a nut 12. Formed in the reinforcing plate 9 on either side of the stud 5 are a pair of openings 13 and 14 in registration respectively with a pair of openings 15 and 16 provided in the back plate and which can be closed by a pair of caps 17 and 18 (see Fig. 2).

Journaled on the cam shaft sleeve 5 is a bearing bushing 19 and mounted on and having a press fit therewith is a cam shaft sleeve 21. Press-fitted on the sleeve 21 is a rectangular plate 22, the rear face of which seats on a shoulder 23 formed on the sleeve. Journaled on the sleeve 21 intermediate its ends are a pair of opposed but identical cam plates 24 and 25 (Fig. 4), each provided at one end with a shoulder 26 and each provided at both of its ends with opposed arcuate bolt slots 27. Extending upwardly from each of the cam plates 24 and 25 is a cam or lever 28 having symmetrical and opposed cam faces 29 and 31. Formed on the lower, outer corner of each of plates 24 and 25 is a lug 32, to which is secured a spring 33. Mounted on the end of the sleeve 21 is a yoke lever 34, including a pair of depending arms 35 and 36 symmetrically arranged with respect to the vertical diameter of the brake and provided with outwardly pressed reinforcing or stiffening ribs 37 and 38. The two opposed cam plates 24 and 25, the rectangular plate 22 and the yoke lever 34 are bolted together as an integral structure for swinging movement about the cam shaft sleeve 5, by bolts 41 and 42 extending through the slots 27 of the cam plates 24 and 25, and through holes formed in the plate 22 and yoke lever 34. Access to the nuts 43 and 44 threaded to the inner ends of the bolts 41 and 42 can be had by removing the caps 17 and 18.

Slidably mounted on the lower ends of the yoke arms 35 and 36 for transverse movement thereon is an electromagnet 45. Connected to the opposed ends of the coil of the magnet are electric leads 46 and 47 accommodated in the channels formed on the under side of the ribs 37 and 38, and held in place by clips 48. The upper ends of the leads 46 and 47 are anchored to insulated binding posts 49 and 50, which in turn communicate through suitable pigtails with a source of direct current.

Fastened to the inner face of the back plate 1 by screws 51 and in alignment with the electromagnet 45, is a pair of laterally spaced permanent magnets 52 and 53 serving continuously to bias the electromagnet away from an armature disc 54 and to hold it slightly spaced from the armature disc at all times, except during braking periods when the electromagnets are positively energized. By resorting to this expedient, rattling of the electromagnet is entirely eliminated. The armature disc 54 (see Fig. 3) is mounted to the inwardly flanged rear end 55 of a brake drum 56.

Journaled in the cam shaft sleeve 5 is a shaft 61, having an outer knurled end for the reception of a hand brake lever 62 (Fig. 3). The opposite end of the shaft 61 terminates in a square end 63 for the reception of a hand brake cam 64, the cam 64 being fastened in place by staking.

Pressed outwardly from the back plate 1 below the horizontal center line thereof, and symmetrically disposed with respect to its vertical center line, is a pair of opposed pockets 65 and 66, each formed with an outer wall 67 and with a lower wall 68. Welded to the inner face of each of the lower walls 68 is a plate 69 (see Fig. 5) and threaded through these members is a screw 70 formed with a flat head 71 on its lower end and with a wrench socket 72 on its upper end. Each screw is locked in any predetermined position relative to its pocket by means of a washer 73 and lock nut 74.

Pressed forwardly from the back plate 1 above the horizontal center line thereof, and symmetrically disposed with the vertical center line thereof, are a pair of pockets 75 and 76; each of these pockets including an outer wall 77. These latter walls and the outer walls 67 of the pockets 66 lying on a circle having its center at the center of the brake. Threaded through the outer walls 77 of the pockets 75 and 76 are brake band adjusting screws 78, each provided at its inner end with a wrench socket 79, and each locked to its wall 77 by a washer 80 and a lock nut 81.

Similarly threaded through the outer walls 67 of the pockets 65 and 66 are brake band adjusting screws 82, each provided with a wrench socket 83 and each locked in position by a washer 84 and a lock nut 85.

Figure 1:
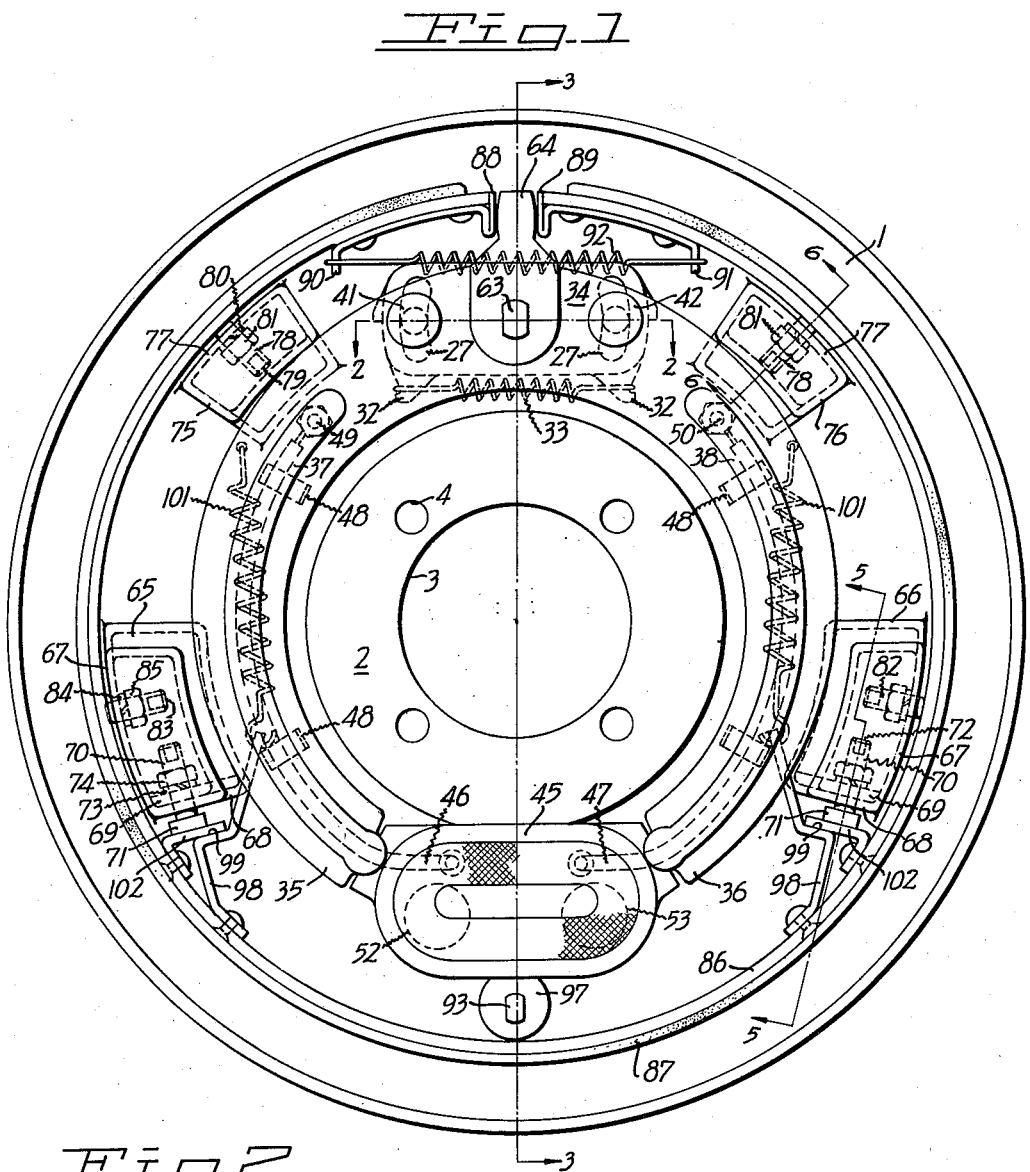
Fig. 1 is a front elevation of a servo electric brake embodying the objects of my invention with its armature plate removed, better to illustrate its construction.

Circumscribing the pockets 65, 66, 75 and 76 is a brake band 86 provided on its exterior face with a brake lining 87, arranged to engage the inner surface of the brake drum 56. As shown in Fig. 1, the two opposed ends of the brake band 86 terminate at points adjacent the brake cams 28 and 64 and are provided with opposed cam shoes 88 and 89 provided at their outer ends with perforated down-turned ears 90 and 91. Secured to and between the ears 90 and 91 is a coil spring 92 for holding the ends of the brake band in their inoperative position away from the brake drum.

Adjustably secured to the back plate 1 on the vertical center line and at the lower end thereof, immediately above the brake band 86, is an adjusting cam pin 93 terminating (as shown in Fig. 3) in a wrench face 94; this pin being detachably secured in place by a split washer 95 and a lock nut 96. Eccentrically secured to the inner end of the pin 93 is a cam disc 97 arranged to engage and locate the position of the brake band 86 at this point.

Riveted to the brake band 86 on either side of the vertical center line thereof, and at a point substantially opposite the electromagnet 45, is a pair of opposed upstanding lugs 98, each provided intermediate its ends with a shoulder 99. Mounted on the upper free end of each of the lugs 98 is the lower end of a coil spring 101, the upper ends thereof being anchored to the back plate 1. Riveted to the brake band 86 adjacent each of the lugs 98 is a stop 102, the free end of which is supported on the shoulder 99. The function of the stops 102 is to limit the rotary movement of the brake band in either one direction or the other so as to prevent the locking of the brake band on the brake drum, as frequently occurs when a full wrap brake band is used.

The brake above described can be readily adjusted so that there will be proper and uniform clearance between the brake band and drum when the band is in its retracted position, by merely turning the screws 70, 78, 82 and 83, and locking them in any desired position, and by rotating the cam pin 93 so that the cam 97 holds the brake band 86 in any desired position, and then locking this pin in place by means of the washer 95 and the lock nut 96. The same procedure is, of course, followed when wear on the brake lining has occurred and it is desired to take up the resulting slack.

In effect the lever 28 of the cam plates 25 and 24 constitute a single lever of adjustable width, for by loosening the nuts 43 and 44, these plates will be urged to rotate in opposite directions by the spring 33 so as to increase the distance between the outer face of one cam and the outer face of the other cam until these respective faces engage the shoes 88 and 89. After the nuts 43 and 44 are tight, the brake is ready for operation.

When the electromagnet 45 is energized it will be attracted to the armature disc 54, and will, of course, tend to move with it. If, as viewed in Fig. 1, the magnet 45 and the yoke 34 move in a clockwise direction, the cams 28 will force the right end of the brake band in a clockwise direction until the head 71 of the left hand screw 70 engages the upper surface of the bracket 102. From this it will be seen that the brake band and the brake drum will come into frictional engagement with each other over a total angle of about 240°. If the armature disc rotates in the opposite direction so as to move the magnet 45 in a counterclockwise direction, the cam 28 will force the left end of the brake band to move in a counterclockwise direction until the head 71 of the screw 70 on the right side of the brake (as viewed in Fig. 1) contacts the left bracket 99. Regardless then, of whether the armature disc moves in a clockwise or counterclockwise direction, the brake band will always engage the brake drum throughout an angle of about 240°.

Another advantageous feature of the brake above described is that it can be used as a hand brake as well as a foot brake. This, of course, is for the reason that the cam 64 can be operated by the lever 62 independently of the action of the electromagnet 45 in either direction to expand the brake drum in the same manner as above described.

Furthermore, the construction of this brake is extremely simple, for all of its elements are interchangeable, and by resorting to pockets pressed into the back plate, the walls thereof may be made to serve as mounting members for the various brake band adjusting pins.

The opposed springs 101 urge the yoke lever 34 to its centered position about the vertical center line of the brake, and the spring 92 maintains the brake band in its contracted non-braking position.

I claim:

1. A brake comprising: a rotary brake drum; a fixed back plate mounted adjacent said brake drum, said back plate being formed with two pairs of opposed pockets outwardly pressed therefrom, the pockets of each pair of opposed pockets being symmetrically arranged with respect to a selected center line of said brake; a split brake band expandably mounted on said back plate between said brake drum and said pockets, the split in said band being located on said center line; a radially extending brake band positioning member adjustably mounted on a wall of each of said pockets; a first stop member mounted on one wall of each pocket of one pair of said pockets; inwardly extending second stop members mounted on said brake band, there being one of said second stop members in alignment with each of said first stop members; and a brake band expanding member mounted on said back plate between the ends of said brake bands.

2. A brake comprising: a rotary brake drum; a fixed back plate mounted adjacent said brake drum; two pairs of opposed pockets pressed outwardly from said plate, the outer side walls of said pockets lying on a common circle concentric with said brake drum and the pockets of each pair of pockets being symmetrically arranged with respect to a selected center line of said brake drum; radially extending brake band positioning and adjusting screws threaded through the outer side wall of each of said pockets with their heads accommodated in said pockets; a split brake band disposed between said brake drum and said pockets with the ends of said band straddling said selected center line; a stop shoulder fastened to said brake band adjacent to and overlying one end wall of each pocket of one of said pairs of pockets; a stop pin extending through each of said latter end walls to a point adjacent to and in alignment with the stop shoulder associated therewith; and a brake band expanding lever mounted on said back plate between the ends of said brake band.

ALFRED E. STOCKER.

REFERENCES CITED

The following references are of record in the file of this patent:

UNITED STATES PATENTS

| Number | Name | Date |
| --- | --- | --- |
| 1,994,813 | Dodge | Mar. 19, 1935 |
| 2,057,724 | La Brie | Oct. 20, 1936 |
| 2,259,835 | Schnell et al. | Oct. 21, 1941 |
| 2,261,331 | Boldt | Nov. 4, 1941 |
| 2,381,655 | Edmonds | Aug. 7, 1945 |
| 2,422,187 | Edgar | June 17, 1947 |